Patented Apr. 23, 1929.

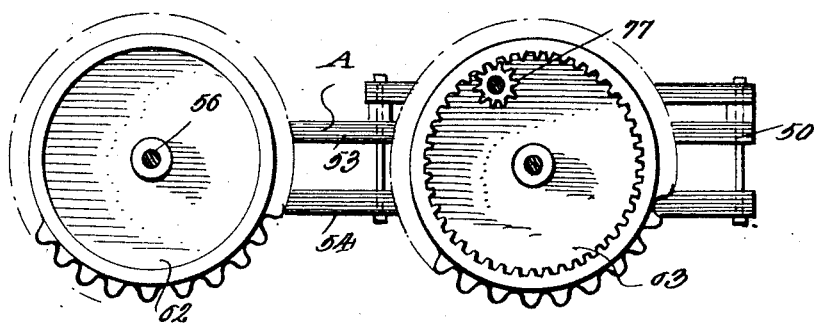
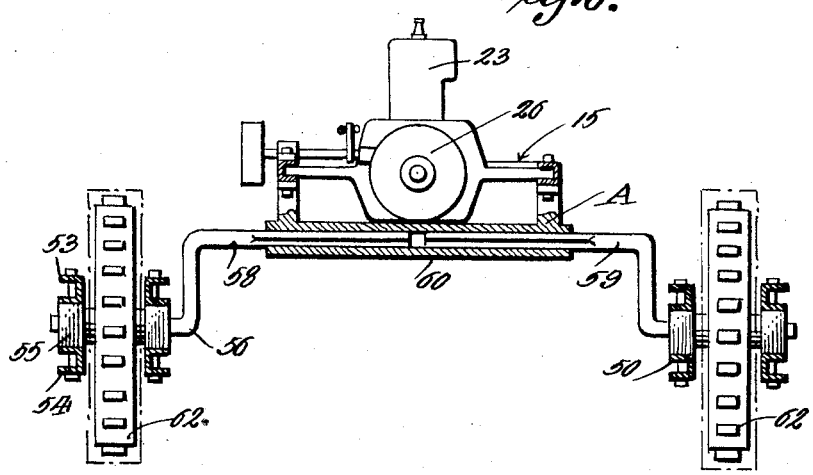

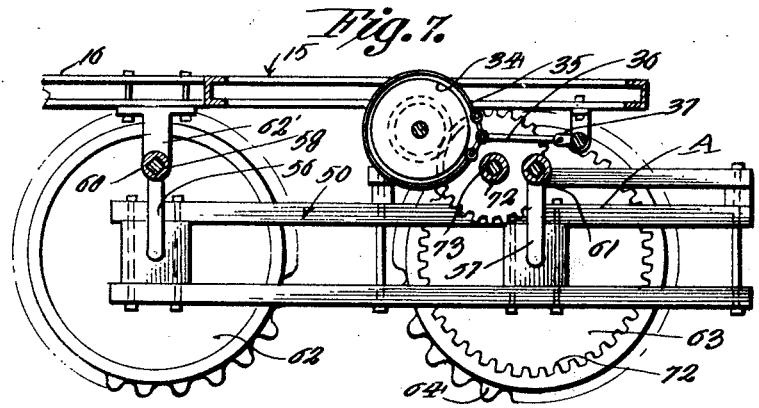
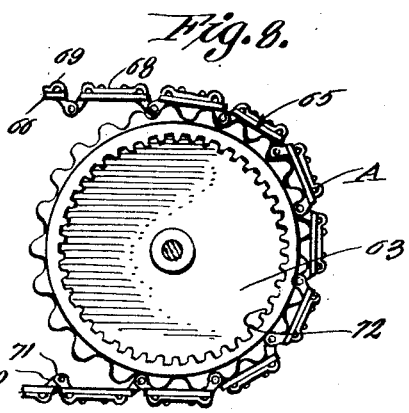
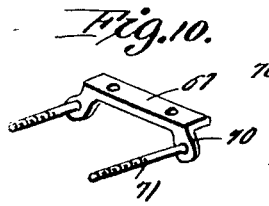
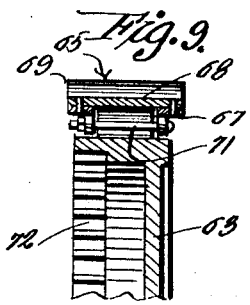

1,710,116

UNITED STATES PATENT OFFICE.

FRANK SEMBERA, OF FLATONIA, TEXAS.

TRACTOR.

Application filed February 12, 1927. Serial No. 167,791.

This invention relates to farming machines and more particularly to a novel tractor which is particularly but not necessarily adaptable for farm work.

One of the primary objects of the present invention is to provide a tractor which will be universal in its nature, that is susceptible for use for all kinds of farm work.

Another salient object of the invention is to provide an improved tractor which is extensible laterally, so that the width thereof can be varied, whereby the tractor can be efficiently used for plowing and the like where a narrow gage tractor is needed and effectively used for planting and cultivating where a wide gage tractor is desirable.

A further object of the invention is the provision of a tractor embodying a main frame carrying the engine and associate part and an auxiliary frame carrying the ground engaging element with novel means for connecting the auxiliary frame with the main frame whereby the auxiliary frame may be extended laterally to change the width of the tractor to permit the same to be used for different purposes.

A further object of the invention is the provision of novel means for associating the auxiliary frame with the main frame whereby the auxiliary frame can be conveniently adjusted and the ground engaging element readily driven from the prime mover or engine.

A further object of the invention is the provision of novel endless traction chains carried by the auxiliary frame with novel means for steering the tractor by braking the drive to one of the other of the said driving traction chains.

A further object of the invention is the provision of novel means for associating the farming implement with the auxiliary frame, said means permitting the ready raising and lowering of the implement.

A still further object of the invention is to provide a farm tractor of the above character which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1:
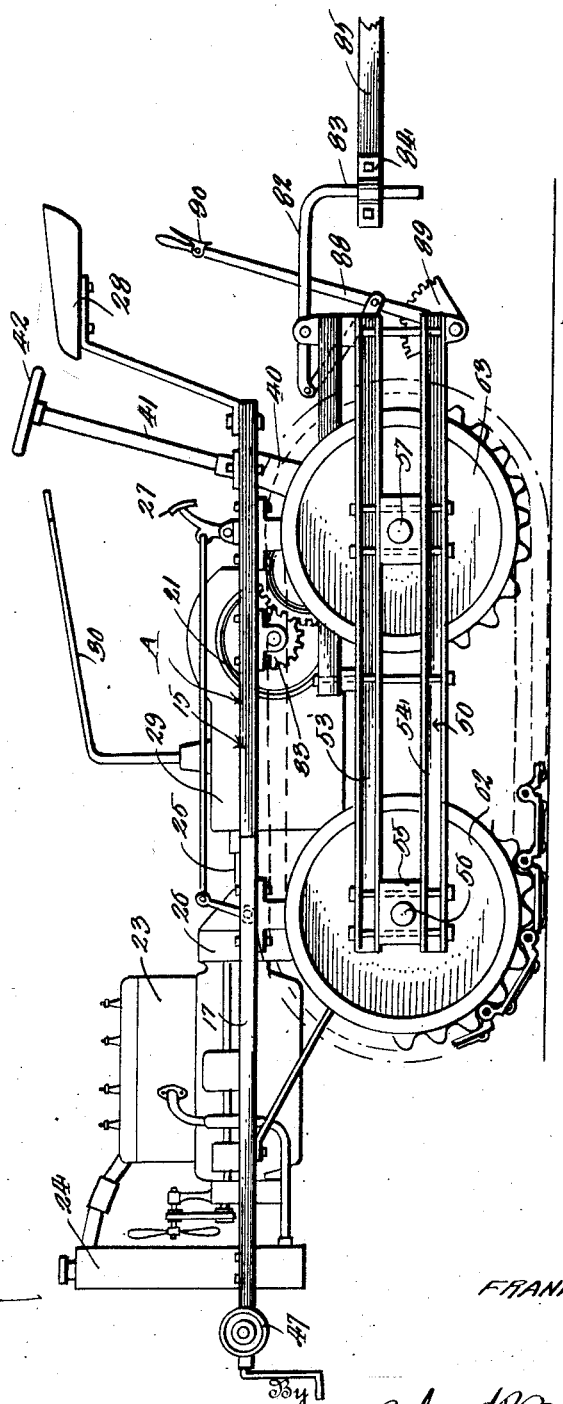
Figure 1 is a side elevation of the improved tractor.
Figure 2:
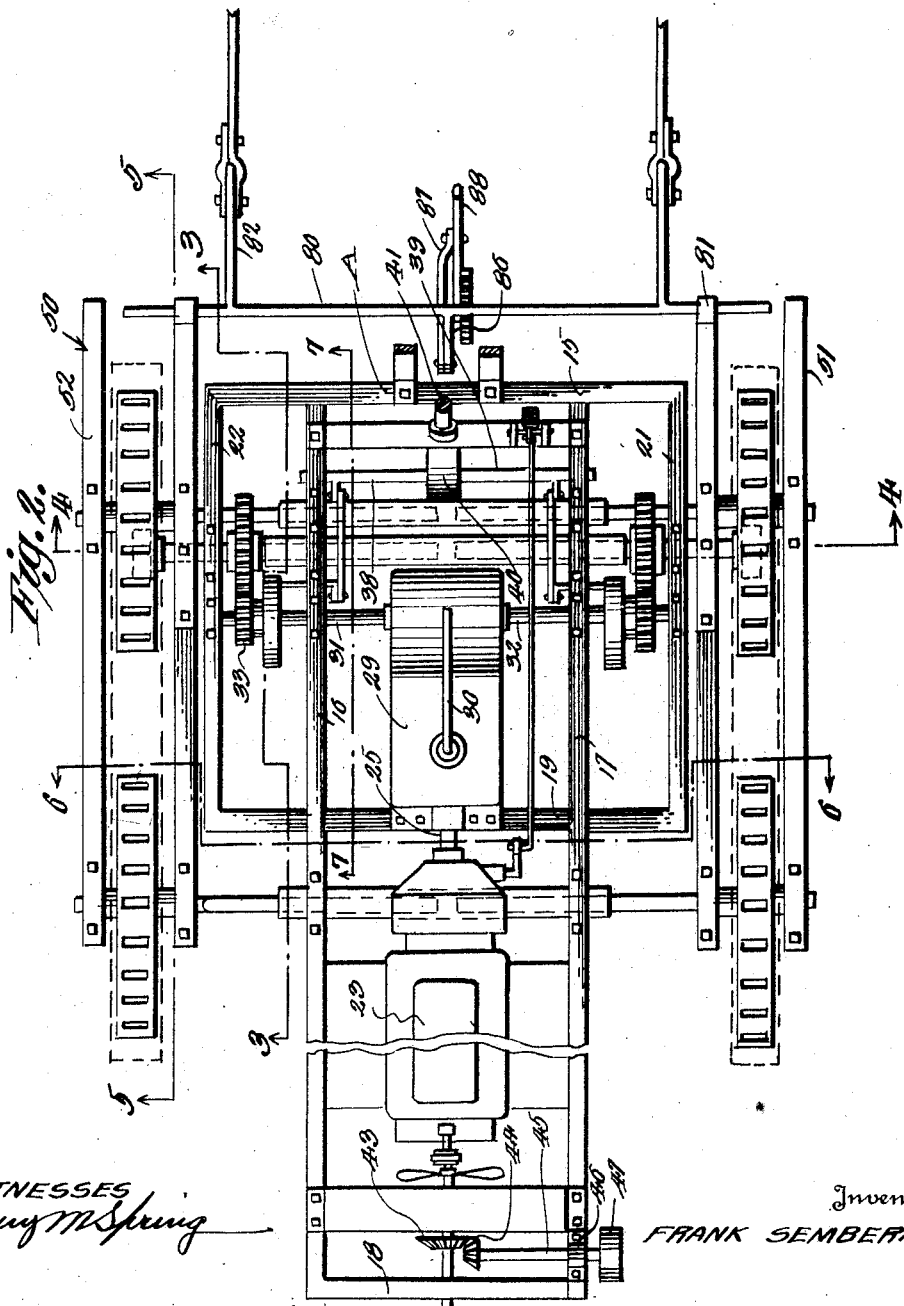
Figure 2 is a top plan view of the improved tractor.
Figure 3:
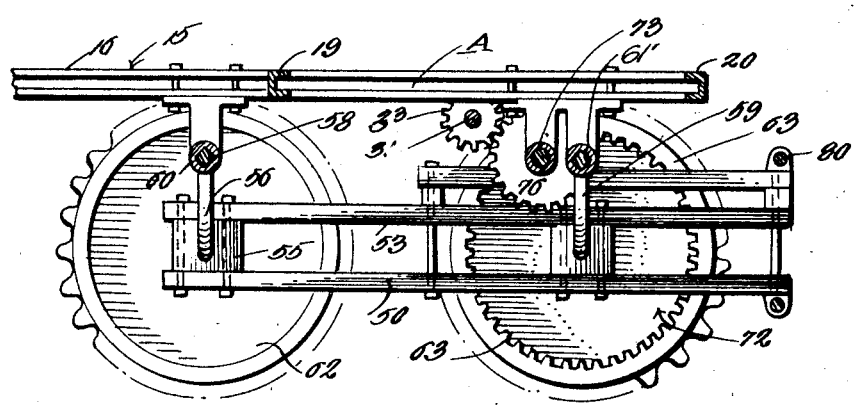
Figure 3 is a longitudinal section through the tractor taken on the line 3—3 of Figure 2 looking in the direction of the arrows illustrating the drive for the traction member and the means for associating an auxiliary frame with the main frame.
Figure 4:
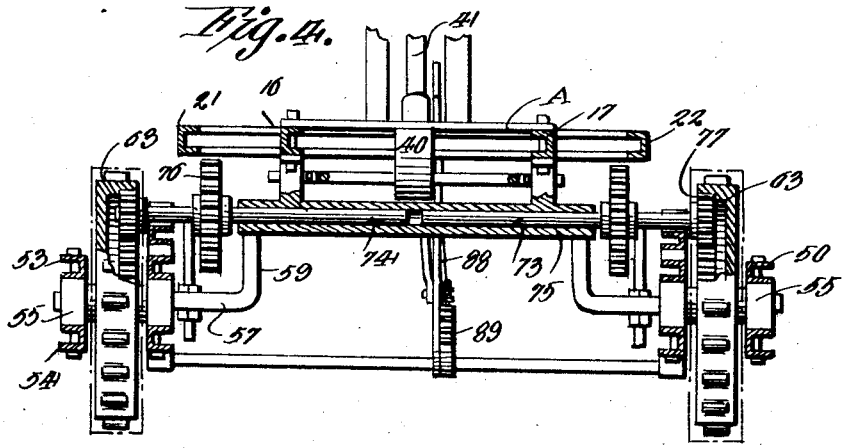

Figure 4 is a transverse section through the tractor taken on the line 4—4 of Figure 2 looking in the direction of the arrows illustrating the novel drive and the formation of the frames, Figure 5 is a fragmentary longitudinal section taken on the line 5—5 of Figure 2 looking in the direction of the arrows showing the formation of the drive wheels associated with the auxiliary frame, Figure 6 is a transverse section taken through the front end of the tractor on the line 6—6 of Figure 2 looking in the direction of the arrows, Figure 7 is a fragmentary longitudinal section through the tractor taken on the line 7—7 of Figure 2 looking in the direction of the arrows illustrating the means of steering and braking the tractor, Figure 8 is a detail section through the rear axle showing the rear drive wheel in side elevation and illustrating the connection of the traction drive chain therewith, Figure 9 is a detail section through the drive wheel and traction chain taken on the line 9—9 of Figure 8, Figure 10 is a detail perspective view of one of the side plates of the traction chain, Figure 11 is a detail perspective view of one of the main drive plates of the traction chain.

Referring to the drawings in detail, wherein similar reference characters designate corresponding parts throughout the several views, the letter A generally indicates the improved tractor, which comprises a main frame 15 and an auxiliary frame 50.

The main frame 15 comprises a pair of spaced longitudinally extending side bars 16 and 17 which can be constructed from channel iron or the like and these side beams are connected together at their forward terminals by a transverse channel beam 18. Adjacent to the rear end of the beams 16 and 17 are a pair of spaced transversely extending channel beams 19 and 20 which extend laterally beyond the side beams 16 and 17 and are connected by the side longitudinally extending beams 21 and 22. The transverse beams 19 and 20 are bolted or otherwise secured to the main side beams 16 and 17 in any desired way. The main frame has mounted thereon adjacent to the forward end thereof the prime mover 23 which is of the internal combustion engine type and this engine may be of any desired size and make best suited for the purpose intended. The engine is cooled by any suitable conventional water cooling system 24 of large capacity. The propeller shaft 25 has incorporated therewith any desired type of clutch mechanism 26 which is actuated by a foot pedal 27 arranged adjacent to the driver's seat 28. This seat 28 is bolted or otherwise secured to the rear transverse frame bar 20 and projects slightly rearwardly beyond the frame. A transmission 29 is also provided and this transmission includes a gear shift lever 30 which also terminates adjacent to the driver's seat. Projecting laterally of the transmission are the drive axles or shafts 31 and 32 respectively and these shafts have keyed or otherwise secured thereto the drive spur gears 33. These shafts have also secured thereto brake drums 34 having conventional brake bands 35 thereabout which are actuated by rearwardly extending links 36. These links 36 are pivotally connected to cranks 37 which are formed on or secured to steering shaft sections 38 and 39. These shaft sections extend into the casing 40 of the control mechanism which is actuated by a steering column 41 and wheel 42. This wheel 42 is arranged directly in front of the driver's seat. By turning the wheel the brake is actuated on one side or the other of the frame according to the direction of the turn and this forms the means for guiding the tractor, as will be later described.

In order to permit the operation of farming machinery from the tractor such as wood saws or the like the propeller shaft 25 forwardly of the motor is provided with a beveled gear 43 which has meshing therewith a beveled cog 44 secured to a cross shaft 45. This cross shaft 45 is mounted in suitable bearings 46 carried by the frame. A pulley belt wheel 47 is keyed to this shaft which forms means for operating a belt for actuating the various farm machinery.

The auxiliary frame 50 comprises frame sections 51 and 52 arranged on opposite sides of the main frame 15 beyond the longitudinal side bars 21 and 22. Each of the side frames 51 and 52 of the auxiliary frame 50 includes a pair of spaced upper channel beams 53 and a pair of lower spaced channel beams 54. These pairs of channel beams can be suitably bolted together and support front and rear pairs of bearing blocks 55 which receive the laterally projecting ends 56 and 57 of the front and rear axles 58 and 59 respectively. Each of these axles are constructed substantially the same and include a pair of sliding sections 59 mounted in sleeves 60 and 61 secured to the main frame 15 by depending bearing blocks 61'. By sliding the sections 58 and 59 inwardly or outwardly of the sleeves 60 and 61 the position of the side frames can be adjusted laterally with respect to the main frame and thus the active width of the tractor can be readily adjusted. Any desired type of locking means can be provided for holding the axle sections in adjusted position, such as set screws or the like. It is to be noted that the axle sections and the sleeves are polygonal shaped in cross section whereby swinging movement of these axles is prevented.

The portions of the axles arranged between the pairs of upper and lower channel beams 53 and 54 rotatably receive the front and rear pull wheels 62 and 63 and the peripheries of these wheels are provided with drive teeth 64. Around each pair of front and rear pull wheels is trained an endless traction belt 65. Each traction belt 65 includes a plurality of hingedly connected sections 66 and these sections are preferably made up of parallel side plates 67 to which are bolted ground plates 68. The front and rear terminals of the ground plate 68 are preferably rolled as at 69 to provide ground engaging traction cleats 69. The ends of the side plates 67 are provided with overlapping inwardly directed pivot ears 70 and these pivot ears of the adjacent side plates are connected by pivot bolts 71. The pivot bolts 71 are received between the teeth 64 of the wheels 62 and 63 so that upon rotation of the wheels the chains or traction belts will be operated. The front wheels 62 constitute idle wheels while the rear wheels 63 constitute power wheels and the inner peripheries of the wheels 63 are provided with ring gears 72. Disposed in front of the rear axle sleeve 61 is a supporting sleeve 72 which is also secured rigidly to the main frame. This sleeve supports a jack shaft 73 which includes a pair of drive sections 74 and 75 which are movable inward and outward of said sleeve. These sections have slidably mounted thereon but rotatable therewith drive gears 76 which mesh with the drive pinions 33 on the drive axles or shafts 31. The gears 76 are preferably confined in place against sliding movement during the inward and outward adjustment of the jack shaft sections 74 and 75 so as to insure the proper meshing of these gears with the drive pinions 33. The extreme outer ends of the jack shaft sections 74 and 75 have keyed or otherwise secured thereto drive pinions 77 which mesh with the crown gears 72 on the drive wheels 63. These drive gears 77 are confined between the upper frame bars 53 and the wheels 63 so that upon movement of the side frames of the auxiliary frame 50 the jack shaft sections will be moved therewith. It is to be noted that the side frames of the auxiliary frame 50 carries suitable bearings for the jack shaft section.

In use of the improved tractor the engine, clutch and transmission are operated in the usual way and the tractor can be conveniently driven over a field. When it is desired to turn the tractor it is merely necessary to stop one of the traction belts or chains and this is accomplished by operating the steering wheel which brakes one or the other of the jack shaft sections.

I have provided novel means for connecting the various farm implements to the tractor, such as plows, planters, cultivators and the like so that the implements can be lifted on the tractor and this means can be slightly varied for each type of farm implement.

In the present instance I have shown one preferred form of connecting a farm implement to the tractor and this means includes a transverse draw bar 80 which has its terminals slidably and rockably mounted in eyes 81 formed on the inner upper frame bars 53 of the auxiliary frame 50. The draw bar 80 adjacent to its opposite ends is provided with rearwardly extending arms 82 which are provided with depending feet 83 at their terminals. These feet are rigidly connected by clamps 84 to the draw bars 85 of the farming implement. Adjacent to the center of the draw bar 80 is an inwardly extending crank arm 86 which has pivotally connected thereto a link 87 which is in turn pivotally connected to the throw lever 88. This throw lever is pivoted to a segmental rack bar 89 and a suitable hand control pawl 90 is carried by the lever for engaging the rack. It can be seen that by swinging the lever 88 that the arms 82 can be raised or lowered, which will raise or lower the farming implement. As stated different forms of connections can be provided for different types of farming implements and means can be provided for permitting the clevis of a plow to be attached to the draw bar.

From the foregoing description it can be seen that I have provided a novel tractor which can be used for all farming purposes and in which the width of the frame can be readily adjusted.

Changes in details may be made without departing from the spirit or scope of this invention, but what I claim as new is:

A tractor comprising a main frame, a power plant on said frame, an auxilliary frame including side members disposed laterally of the main frame each consisting of upper and lower bars, blocks between and spacing said bars, axles non-rotatably carried by said blocks extending inwardly toward the main frame and having their inner ends polygonal shaped in cross section, front and rear wheels carried by said axles, rigid front and rear sleeves secured to the main frame of polygonal shape in cross section slidably receiving the polygonal ends of said axles, a transmission for the power plant carried by the main frame including oppositely extending drive shafts, a bearing sleeve, a jack shaft including a pair of rotatably and slidable sections mounted in the bearing sleeve, means for operating the sections from the drive shaft, and means for operating certain of the wheels from the outer terminals of the jack shaft sections.

In testimony whereof I affix my signature.

FRANK SEMBERA.